(12) United States Patent
Hernvall et al.

(10) Patent No.: US 11,981,243 B2
(45) Date of Patent: May 14, 2024

(54) VEHICLE COMPRISING A LOAD HANDLING ARRANGEMENT TO SUPPORT LOADING AND UNLOADING VIA THE FRONT OF THE VEHICLE

(71) Applicant: Volvo Truck Corporation, Gothenburg (SE)

(72) Inventors: Christina Hernvall, Gothenburg (SE); Lars Johansson, Sätila (SE); Mikael Lennartsson, Kode (SE); Marcus Fasth, Trollhättan (SE); Bo Larsson, Västra Frölunda (SE)

(73) Assignee: Volvo Truck Corporation, Gothenburg (SE)

( * ) Notice: Subject to any disclaimer, the term of this patent is extended or adjusted under 35 U.S.C. 154(b) by 497 days.

(21) Appl. No.: 17/432,149

(22) PCT Filed: Feb. 22, 2019

(86) PCT No.: PCT/EP2019/054459
§ 371 (c)(1),
(2) Date: Aug. 19, 2021

(87) PCT Pub. No.: WO2020/169208
PCT Pub. Date: Aug. 27, 2020

(65) Prior Publication Data
US 2022/0185163 A1 Jun. 16, 2022

(51) Int. Cl.
*B60P 1/43* (2006.01)
*B62D 59/02* (2006.01)

(52) U.S. Cl.
CPC .............. *B60P 1/435* (2013.01); *B62D 59/02* (2013.01)

(58) Field of Classification Search
CPC ................................. B60P 1/435; B62D 59/02
See application file for complete search history.

(56) References Cited

U.S. PATENT DOCUMENTS

| 6,139,091 A | 10/2000 | Shultz |
| 11,535,142 B1 * | 12/2022 | Pedersen .................. B60P 1/52 |

(Continued)

FOREIGN PATENT DOCUMENTS

| CN | 204210356 U | 3/2015 |
| CN | 105383708 A | 3/2016 |

(Continued)

OTHER PUBLICATIONS

International Search Report and Written Opinion for International Patent Application No. PCT/EP2019/054459, dated Feb. 6, 2020, 18 pages.

(Continued)

*Primary Examiner* — Brian L Swenson
(74) *Attorney, Agent, or Firm* — Withrow & Terranova, PLLC

(57) ABSTRACT

The present disclosure relates to a vehicle (100) comprising at least a towing vehicle (102), the towing vehicle comprising steerable wheels and is arranged to convey the vehicle in at least a major longitudinal forward direction (104) of the vehicle (100), wherein the vehicle further comprises a load handling arrangement (200) arranged to support transportation of material to or from the vehicle (100), the load handling arrangement (200) being configured to assume a material handling mode in which the load handling arrangement (200) is arranged to support transportation of the material between the vehicle (100) and a stationary ground portion (106) in the vicinity of the vehicle (100), wherein the load handling arrangement (200) extends substantially in the major longitudinal forward direction (104) of the vehicle over at least a portion of the towing vehicle (102) when assuming the material handling mode.

25 Claims, 5 Drawing Sheets

(56) References Cited

U.S. PATENT DOCUMENTS

| | | | |
|---|---|---|---|
| 2002/0088065 A1 | 7/2002 | Schmaltz et al. | |
| 2013/0223963 A1 | 8/2013 | Kramlick | |
| 2018/0147969 A1* | 5/2018 | Richardson | ............... B60P 1/38 |
| 2022/0185048 A1* | 6/2022 | Yhr | ......................... H04W 4/40 |
| 2023/0138277 A1* | 5/2023 | Blomstrand | ....... B62D 53/0864 |
| | | | 280/476.1 |
| 2024/0034113 A1* | 2/2024 | Laine | ..................... B62D 15/02 |

FOREIGN PATENT DOCUMENTS

| | | |
|---|---|---|
| DE | 8810762 U1 | 10/1988 |
| DE | 102012009894 A1 | 11/2013 |
| GB | 1003072 A | 9/1965 |

OTHER PUBLICATIONS

International Preliminary Report on Patentability for International Patent Application No. PCT/EP2019/054459, dated Nov. 27, 2020, 17 pages.

* cited by examiner

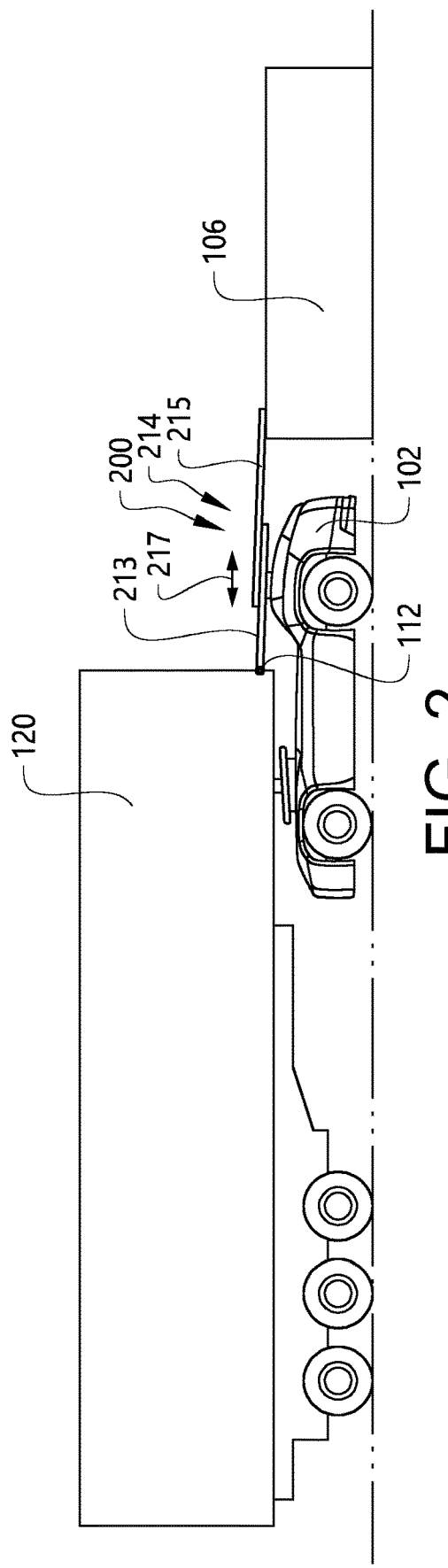
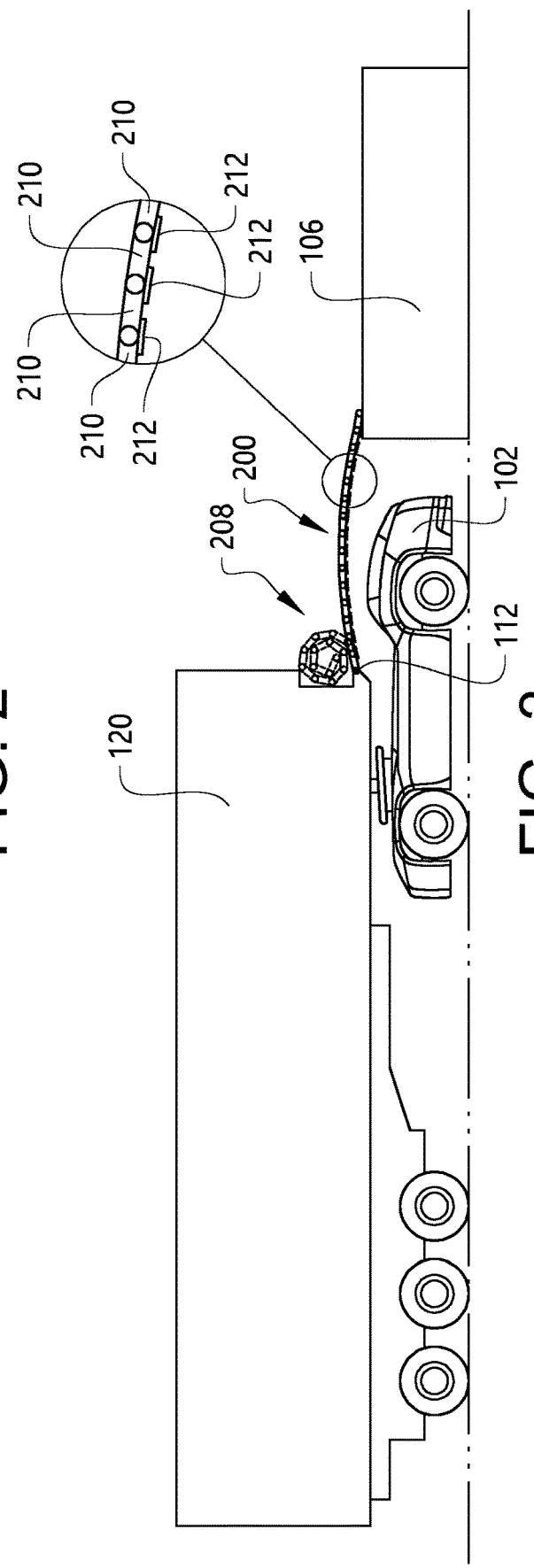

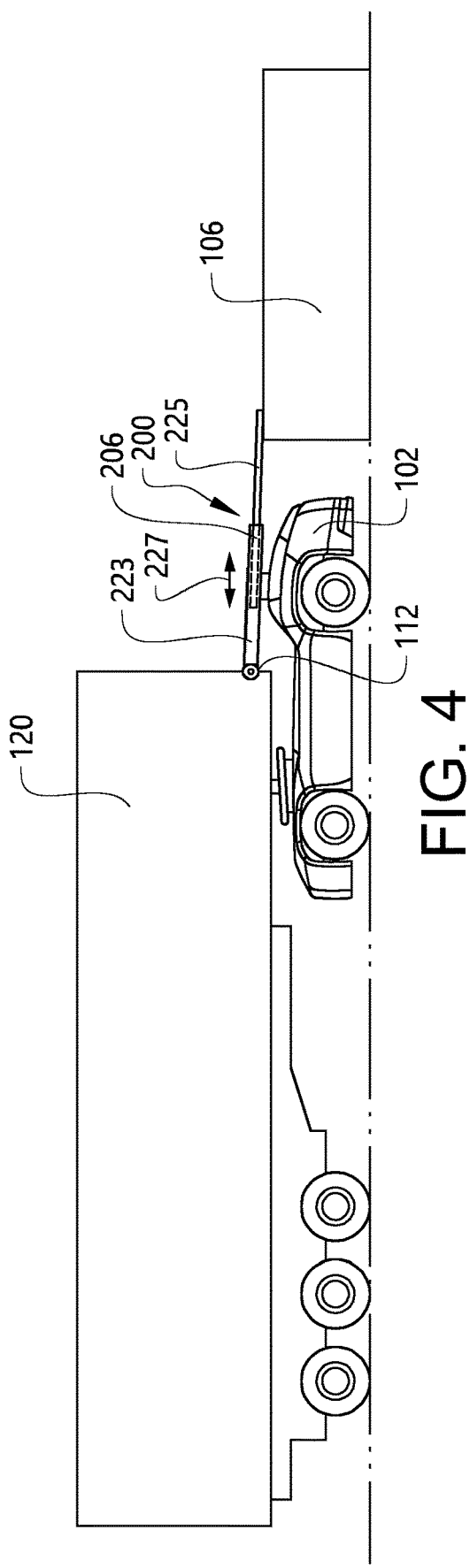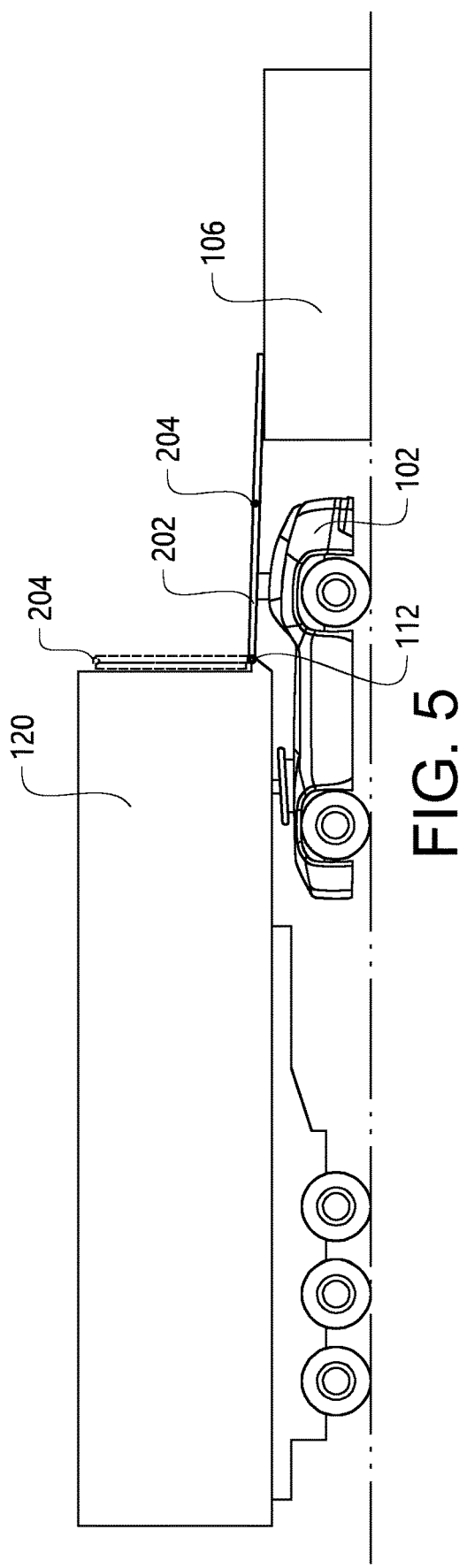

VEHICLE COMPRISING A LOAD HANDLING ARRANGEMENT TO SUPPORT LOADING AND UNLOADING VIA THE FRONT OF THE VEHICLE

This application is a 35 USC 371 national phase filing of International Application No. PCT/EP2019/054459, filed Feb. 22, 2019, the disclosure of which is incorporated herein by reference in its entirety.

TECHNICAL FIELD

The present disclosure relates to a vehicle comprising at least a towing vehicle. The vehicle is preferably arranged to connect to a trailer for transporting goods and material. The vehicle is preferably a towing truck vehicle, in the form of an autonomous truck.

BACKGROUND

Heavy vehicle in the form of trucks are used for transportation of material, such as goods and cargo. The material is often loaded to the vehicle, preferably onto a trailer at a loading position. The vehicle is thereafter driven to an unloading position where the material is unloaded from the trailer.

Before loading the trailer with material, the vehicle, i.e. the towing vehicle and the trailer is driven in the reversed direction until reaching the loading position, where it is docking at the loading position for receiving the material. The material is conveyed into the trailer via an opening at the rear end of the trailer. When thereafter arriving at the unloading position, the vehicle is again reversed until reaching the unloading position, where it is docking at the unloading position for delivery of the material.

During unloading of material, the material is often arranged to face the front end of the trailer as it was provided into the trailer form the rear end. The material is thus facing the "wrong" end of the trailer as it should be directed to the rear end for unloading at the opening at the rear end. Thus, the material needs to be unloaded by reversing or by first moving the material 180 degrees within the trailer, where after unloading can be initiated.

Moreover, the loading/unloading process of reversing the vehicle towards the loading/unloading position is relatively time consuming and also associated with safety risks for persons occupying the vicinity of the vehicle.

Accordingly, there is a desire to simplify loading/unloading of material from a vehicle, whereby the efficiency of the loading/unloading process is increased while at the same time improving the safety during loading/unloading.

SUMMARY

It is an object of the present disclosure to describe a vehicle which at least partially overcomes the above described deficiencies. This is achieved by a vehicle according to claim 1.

According to a first aspect, there is provided a vehicle comprising at least a towing vehicle, the towing vehicle comprising steerable wheels and is arranged to convey the vehicle in at least a major longitudinal forward direction of the vehicle, wherein the vehicle further comprises a load handling arrangement arranged to support transportation of material to or from the vehicle, the load handling arrangement being configured to assume a material handling mode in which the load handling arrangement is arranged to support transportation of the material between the vehicle and a stationary ground portion in the vicinity of the vehicle, wherein the load handling arrangement extends substantially in the major longitudinal forward direction of the vehicle over at least a portion of the towing vehicle when assuming the material handling mode.

The wording "major longitudinal forward direction" should be construed as the longitudinal forward direction of the major part of the vehicle. For example, if the vehicle only comprises the towing vehicle, the major longitudinal forward direction is the longitudinal direction of the towing vehicle. If, on the other hand, the vehicle also comprises a trailer, which trailer has a longitudinal length which is longer than the longitudinal length of the towing vehicle, the major longitudinal forward direction is the longitudinal direction of the trailer. In the latter case, the towing vehicle might be rotated at the fifth wheel coupling, whereby the load handling arrangement extends substantially in the same direction as the longitudinal direction of the trailer. The wording "substantially" should thus be construed such that a tolerance can be present. Hence, a deviation, around a vertical geometric axis by e.g. ±10 degrees should be acceptable, preferably ±5 degrees.

Moreover, the wording "load handling arrangement" should be construed such as a structural component extending in the longitudinal direction when assuming the material handling mode. In more detail, the load handling arrangement should be able to carry material cargo from e.g. a trailer connectable to the towing vehicle, such as to load/unload the material to/from the trailer. The load handling arrangement should hence be arranged to connect to the stationary ground portion when assuming the material handling mode. As will be described below, the load handling arrangement may e.g. be a ramp arranged in various configurations. The load handling arrangement may be arranged on the towing vehicle. As an alternative, the load handling arrangement may be arranged on a front portion of a trailer connected to the towing vehicle, as will be described further below.

Furthermore, the wording "stationary ground portion" should be construed such as the ground onto which the vehicle is driven. The wording may also be related to a loading dock at which material is loaded onto/from the vehicle. The stationary ground portion may also be a stationary portion arranged on the ground surface. Thus, the stationary ground portion is a position in the vicinity of the vehicle, when the vehicle is at stand-still, whereat material can be loaded onto/from the vehicle.

Still further, the material handling mode should be construed as an operating mode at which material can be loaded onto/from the vehicle. Thus, in the material handling mode, material can be transported on the load handling arrangement, onto or from the vehicle. Material should be construed as any type of cargo that can be transported by a vehicle.

The present disclosure is based on the insight that loading/unloading can be made in the forward direction of the vehicle, in comparison to at the rear end. An advantage is thus that the vehicle can be driven in a forward direction towards the loading/unloading position. Reversing will not be necessary and simplified approaching of the loading/unloading position is achieved. Avoiding reversing will also increase the safety for persons in the vicinity of the vehicle at the loading/unloading position. As such, the process flow can be made more rapidly, whereby lead-times can be reduced. Also, in combination with a load handling arrangement at the rear end, a simplified work flow can be achieved, as material must not be reversed in e.g. the trailer before unloading. In detail, when loading from the rear end and unloading at the front end, loading and unloading is made in the same direction thereby avoiding unnecessary re-distribution of the cargo.

According to an example embodiment, the load handling arrangement may be further configured to assume a non-material handling mode in which the load handling arrangement is solely in connection with the vehicle.

The wording "non-material handling mode" should thus be construed as an operating mode in which the load handling arrangement is unable to convey material between the vehicle and the stationary ground portion.

According to an example embodiment, the load handling arrangement may be configured to be moved over at least the portion of the towing vehicle when changing the load handling arrangement from assuming the non-material handling mode to assuming the material handling mode.

Accordingly, when the vehicle has arrived at the loading/unloading position, the load handling arrangement can be operated from the non-material handling mode to the material handling mode, such as to be able to convey material between the vehicle and the stationary ground portion.

According to an example embodiment, the load handling arrangement may be a ramp arranged to support load from the transported material to/from the vehicle.

By "ramp" should be understood a ramp that is able to carry a load that is conveyed between the vehicle and the stationary ground portion.

According to an example embodiment, the ramp may be a foldable ramp comprising a pivot point around which the foldable ramp is pivotable for being extended substantially in the major longitudinal forward direction of the vehicle when assuming the material handling mode.

Hereby, the ramp can be extended when arranged to support the material being conveyed. Also, when the ramp assumes the non-material handling mode, it can be relatively small in size. Preferably, the foldable ramp can be arranged in a substantially upright position when assuming the non-material handling mode. Hereby, the foldable ramp can act as a front end support for material arranged rearward of the ramp.

Moreover, a foldable ramp is advantageous as it enables for loading/unloading at relatively low-level positions in front of the vehicle.

According to an example embodiment, the ramp may comprise a telescopic portion, wherein the telescopic portion is configured to be arranged in an extended state when the ramp assumes the material handling mode.

The telescoping portion thus extends substantially in the major longitudinal forward direction when the ramp assumes the material handling mode. An advantage is that a less bulky ramp is provided when assuming the non-material handling mode, i.e. when not in use.

According to an example embodiment, the ramp may be arranged as a rolled-up ramp, wherein the rolled-up ramp is arranged in an unrolled state forming a substantially convex shape when the ramp assumes the material handling mode.

A rolled-up ramp is also less bulky when assuming the non-material handling mode, i.e. when not in use. Forming the ramp in a substantially convex shape when assuming the material handling mode will enable for sufficient strength when the ramp is exposed to the material transportation.

According to an example embodiment, the rolled-up ramp may comprise a plurality of ramp elements, each ramp element being pivotable relative its closest adjacent ramp element, wherein each ramp element is pivotable around a geometric axis which is perpendicular to the extension of the rolled-up ramp when assuming the material handling mode.

According to an example embodiment, the rolled-up ramp may comprise a locking element between the ramp elements, the locking element restricting the pivotable motion of the ramp elements.

Hereby, the locking elements will further strengthen the ramp to be able to sustain the load from the material transportation.

According to an example embodiment, the ramp may be a slidable ramp arranged to slide over at least a portion of the towing vehicle when arranging the ramp to assume the material handling mode.

According to an example embodiment, the towing vehicle may comprise a load support portion arranged to support the load handling arrangement when the load handling arrangement assumes the material handling mode.

Hereby, the load handling arrangement is arranged to "rest" on the load support portion. An advantage is that the load from the material transported onto the load handling arrangement will be handled efficiently. A more robust load handling arrangement is provided, i.e. the strength is improved.

According to an example embodiment, the load support portion may be adjustable in at least one of a vertical direction or a horizontal direction of the vehicle.

Hereby, the load support portion can be adjusted based on the specific application and e.g. the position of the specific stationary ground portion onto which the load handling arrangement is to load/unload material.

According to an example embodiment, the load handling arrangement may be one of an electronically controlled load handling arrangement, a hydraulically controlled load handling arrangement, a pneumatically controlled load handling arrangement, or a winch controlled load handling arrangement.

According to an example embodiment, the vehicle may comprise a trailer pivotably connected to the towing vehicle at a rear end of the towing vehicle.

Hereby, the material to be transported is preferably positioned in the trailer. When unloading, the material is transported from the trailer in a forward direction onto the load handling arrangement and further to the stationary ground portion.

According to an example embodiment, the load handling arrangement may be positioned on the trailer at a front portion of the trailer, the load handling arrangement being configured to extend from the front portion of the trailer and over at least a portion of the towing vehicle when the load handling arrangement assumes the material handling mode.

According to an example embodiment, the towing vehicle may be configured to be pivoted relative the trailer before the load handling arrangement assumes the material handling mode.

The pivotal motion of the towing vehicle is preferably controlled by a control unit arranged on the towing vehicle for controlling operation thereof. Accordingly, according to example embodiment, the vehicle may further comprise a control unit configured to control operation of the load handling arrangement. Hence, the control unit may control operation of the vehicle, as well as of the load handling arrangement.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

Pivoting the towing vehicle is advantageous as it enables less extension of the load handling arrangement when assuming the material handling mode. In other words, the load handling arrangement can be extended to a lesser degree in comparison to be extended over the entire towing vehicle. As described above, the major longitudinal forward direction should here be construed as the forward direction of the trailer, which constitutes the major longitudinal part of the vehicle.

According to an example embodiment, the control unit may be configured to receive a signal indicative of the load handling arrangement being arranged in connection with the ground when the load handling arrangement assumes the material handling mode.

Hereby, the control unit can determine that the vehicle is ready for loading/unloading of material. The signal may be received from a sensor of the load handing arrangement or received from a control station which supervises the activity of the vehicle. Other alternatives are also conceivable.

According to an example embodiment, the vehicle may comprise means for detecting obstacles in front of the towing vehicle. According to an example embodiment, the means for detecting obstacles may be one of a camera or a sensor. According to an example embodiment, the means for detecting obstacles may be positioned at a front end portion of the load handling arrangement.

An advantage is that the load handling arrangement is substantially prevented from colliding with obstacles in front of the vehicle. The means for detecting obstacles may, for example, be activated when the changing the load handling arrangement from assuming the non-material handling mode to assuming the material handling mode. The means for detecting obstacles may also be arranged to guide the load handling arrangement to the stationary ground portion.

According to an example embodiment, the vehicle may be an autonomous vehicle. According to an example embodiment, vehicle may be a driver cabin free vehicle.

A cabin free vehicle, preferably a cabin free autonomous vehicle, is advantageous as the overall height of the towing vehicle is relatively low. According to an example embodiment, the towing vehicle may a height in the range between 1.40-1.80 meters. Such relatively low towing vehicle can advantageously use the above described load handling arrangement extending in front of the vehicle when handling material transportation.

According to a second aspect, there is provided a method for controlling a load handling arrangement of a vehicle, the vehicle comprises a towing vehicle arranged to convey the vehicle in at least a major longitudinal forward direction of the vehicle, wherein the vehicle further comprises a load handling arrangement arranged to support transportation of material to or from the vehicle, the method comprising the steps of: determining that the vehicle is located at a position for loading/unloading of material to/from the vehicle; and controlling the load handling arrangement to extend substantially in the major longitudinal forward direction of the vehicle over at least a portion of the towing vehicle to a stationary ground portion in front of the vehicle.

Effects and features of the second aspect are largely analogous to those described above in relation to the first aspect. Embodiments described in relation to the first aspect are equally applicable for the second aspect.

According to a third aspect, there is provided a system for controlling a load handling arrangement of a vehicle, the system comprising at least one vehicle comprises a towing vehicle arranged to convey the vehicle in at least a major longitudinal forward direction of the vehicle, wherein the vehicle further comprises a load handling arrangement arranged to support transportation of material to or from the vehicle, the vehicle further comprising a control unit for at least controlling operation of the load handling arrangement, wherein the system further comprises a control station for communicating with the control unit of the vehicle, the system being configured to: transmit a control signal from the control station to the control unit of the vehicle, the control signal being indicative that the vehicle is located at a position for loading/unloading of material to/from the vehicle; and control the load handling arrangement to extend substantially in the major longitudinal forward direction of the vehicle over at least a portion of the towing vehicle to a stationary ground portion in front of the vehicle.

Effects and features of the third aspect are largely analogous to those described above in relation to the first aspect. Embodiments described in relation to the first aspect are equally applicable for the third aspect.

According to a fourth aspect, there is provided a computer program comprising program code means for performing the method described above in relation to the second aspect when the program is run on a computer.

According to a fifth aspect, there is provided a computer readable medium carrying a computer program comprising program means for performing the method described above in relation to the second aspect when said program means is run on a computer.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features and advantages, will be better understood through the following illustrative and non-limiting detailed description of exemplary embodiments, wherein:

FIG. 2 is a schematic illustration of a vehicle and load handling arrangement according to an example embodiment;

FIG. 3 is a schematic illustration of a vehicle and load handling arrangement according to further example embodiment;

FIG. 4 is a schematic illustration of a vehicle and load handling arrangement according to further example embodiment;

FIG. 5 is a schematic illustration of a vehicle and load handling arrangement according to a further example embodiment;

DETAILED DESCRIPTION

Figure 1:
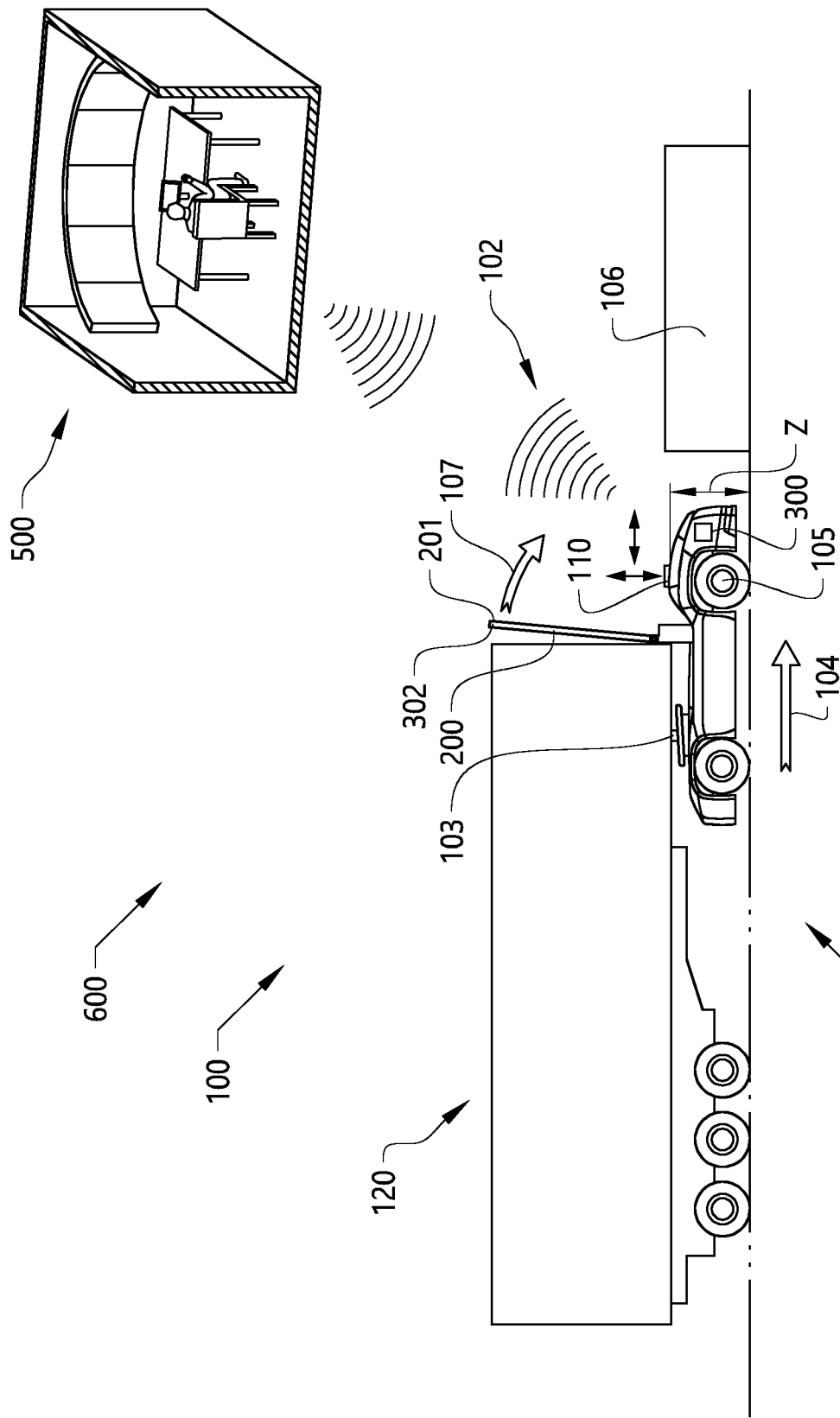
FIG. 1 is a schematic illustration of a vehicle according to an example embodiment, and a system for controlling the vehicle.

The present disclosure will now be described more fully hereinafter with reference to the accompanying drawings, in which an exemplary embodiment is shown. The disclosure may, however, be embodied in many different forms and should not be construed as limited to the embodiments set forth herein; rather, these embodiments are provided for thoroughness and completeness. Like reference character refer to like elements throughout the description.

With particular reference to FIG. 1, there is provided a vehicle 100 as well as a system 600 for controlling a load handling arrangement 200 of the vehicle. The vehicle 100 in FIG. 1 comprises a towing vehicle 102 and a trailer 120 which is pivotally connected to the towing vehicle at a fifth wheel coupling 103 arranged on the towing vehicle 102. Hence, the trailer 102 is articulating to the towing vehicle 102 at the fifth wheel coupling 103.

Moreover, the towing vehicle 102 comprises a pair of steerable wheels 105 and is arranged to convey the vehicle 100 in at least the major forward direction, indicated by reference numeral 104. The towing vehicle 102 is of course also arranged to reverse and be driven in a rearward direction. The towing vehicle 102 is preferably an autonomous vehicle which comprises a control unit 300 for controlling operation thereof. The control unit 300 may, for example, be connected to a control station 500, which can control operation of the vehicle by means of wirelessly transmittal of control signals to the control unit 300. The towing vehicle 102 in FIG. 1 is also preferably cabin free and has a height Z in the range between 1.40-1.80 meters.

The vehicle 100 and control station 500 thus forms part of a system 600 for controlling operation of the vehicle 100, as well for controlling operation of components arranged on the vehicle, such as the load handling arrangement 200. Other alternatives are of course conceivable. For example, the control unit 300 may comprise control algorithms for controlling operation without the need of communication with control station 500.

Moreover, as indicated above, the vehicle 100 comprises a load handling arrangement 200. The load handling arrangement 200 will in the following be referred to as a ramp 200. The ramp 200 is arranged to support transportation of material between the trailer and a stationary ground portion 106 in front of the vehicle 100. In FIG. 1, the ramp 200 is connected to the towing vehicle 102 and is, as depicted, moved from a non-material handling mode, in which material can not be transported to the stationary ground portion, towards a material handling mode in which the ramp 200 is arranged to support transportation of the material between the vehicle 100 and the stationary ground portion 106. The vehicle 100 is preferably stationary when the ramp 200 assumes the material handling mode. The stationary ground portion 106 is here illustrated as a loading dock at which the vehicle receives and/or delivers material.

Moreover, when the ramp 200 assumes the non-material handling mode as depicted in FIG. 1, the ramp can act as a front cover for the trailer 120. Although the trailer 120 is depicted as a "closed" trailer with surrounding walls, it may equally as well be an open trailer without side walls. In such case, the ramp 200 may be particularly useful as a wind shield when driving the vehicle 100.

Furthermore, as depicted by arrow 107 in FIG. 1, the ramp 200 is about to assume the material handling mode. This is executed by moving the ramp 200 to extend in the major longitudinal forward direction 104 over at least a portion of the towing vehicle 102. In the embodiment depicted in FIG. 1, the ramp 200 extends over the steerable wheels 105 and over the front end of the towing vehicle 102. Moreover, the towing vehicle 102 comprises a load support portion 110 arranged in front of the ramp 200. When the ramp 200 assumes the material handling mode, the load support portion 110 preferably supports the ramp 200. Hence, the ramp 200 rests against the load support portion 110 as well against the stationary ground portion 106. The load from the ramp 200 when transporting material between the trailer 120 and the stationary ground portion 106 can be efficiently handled as the strength of the ramp 200 will be increased by the use of the load support portion 110. The load support portion 110 is preferably adjustable in the vertical direction and/or the horizontal direction. Hereby, the load support portion 110 can be adjusted based on e.g. the size and configuration of the stationary ground portion 106 in front of the vehicle 100.

Moreover, the vehicle also comprises means 302 for detecting obstacles in front of the towing vehicle 102. As depicted in FIG. 1, the means 302 for detecting obstacles is arranged at a front end portion 201 of the ramp 200. Preferably, the means 302 for detecting obstacles is a camera or a sensor of suitable type, such as a motion sensor or an object detecting sensor.

The ramp 200 is preferably controlled by receiving control signals from the control unit 300. The ramp 200 may, for example be electronically controlled whereby the control unit 300 transmits control signals to e.g. an electric motor (not shown) controlling the ramp 200 between the non-material handling mode and the material handling mode. The ramp 200 may also be hydraulically controlled, whereby the control unit 300 transmits control signals to a hydraulic system (not shown) controlling the ramp 200 between the non-material handling mode and the material handling mode. As a still further example, the ramp 200 may be pneumatically controlled whereby the control unit 300 transmits control signals to a pneumatic system (not shown) controlling the ramp 200 between the non-material handling mode and the material handling mode.

The ramp 200 may be arranged in a wide variety of configurations. In order to describe some of these embodiments, reference is made to FIGS. 2-5. The embodiments in FIGS. 2-5 comprise the features of the vehicle described above in relation to FIG. 1, with exception from the ramp. Also, in FIG. 1, the ramp 200 is connected to the towing vehicle 102. In FIGS. 2-5, the ramp 200 is connected to a front portion 112 of the trailer 102. It should however be readily understood that the ramp 200 in FIGS. 2-5 may equally as well be connected to the towing vehicle 102 in a similar vein as depicted in FIG. 1.

With initial reference to FIG. 2, an example embodiment of the ramp 200 is depicted. As can be seen, the ramp 200 is pivotably connected to the trailer at the front portion 112 of the trailer. Thus, the ramp 200 is preferably raised and lowered by a pivotal motion. Furthermore, the ramp in FIG. 2 is arranged as a slidable ramp 214. The slidable ramp 214 comprises an inner portion 213 and an outer portion 215, where the inner portion 213 constitutes the pivotably connected portion of the ramp, while the outer portion 215 is arranged to be in contact with the stationary ground portion 106 when the ramp assumes the material handling mode. In further detail, the outer portion 215 is slidable relative the inner portion 213 in the direction of the arrow indicated by reference numeral 217. The slidable ramp 214 is thus arranged to slide over at least a portion of the towing vehicle when arranging the ramp to assume the material handling mode.

In order to describe another example embodiment, reference is made to FIG. 3 illustrating the ramp 200 in the form of a rolled-up ramp 208. As can be seen, the rolled-up ramp 208 is indicated in dashed lines when assuming the non-material handling mode, and indicated in solid lines when assuming the material handling mode.

In the non-material handling mode, the rolled-up ramp is arranged in a rolled up state and positioned on the trailer 120 at the front portion 112 thereof. In the material handling mode, the rolled-up ramp is arranged in an unrolled state and extends from the front portion 112 of the trailer 120 over the trailer 102 in the form of a convex shape. As depicted in the zoom in portion of FIG. 3, the rolled up ramp 208 comprises a plurality of ramp elements 210. Each ramp element is pivotable relative its closest adjacent ramp element 210 to form the convex shape of the rolled up ramp 208. Furthermore, the rolled-up ramp comprises a plurality of locking elements 212 between each of the ramp elements. The locking elements 212 are arranged for restricting the pivotable motion of the ramp elements 210. In detail, the locking elements 212 will assist in preventing the rolled-up ramp from collapsing when exposed to a load from the material transported thereon.

In order to describe another example embodiment, reference is made to FIG. 4 illustrating the ramp 200 comprising a telescopic portion 206. The ramp 200 in FIG. 4 is pivotably connected to the trailer at the front portion 112 of the trailer. Thus, the ramp 200 is preferably raised and lowered by a pivotal motion. The telescopic portion 206 has a similar functionality as the slidable ramp described above in relation to FIG. 2. Hence, the telescopic portion 206 comprises an inner portion 223 and an outer portion 225, where the inner portion 223 constitutes the pivotably connected portion of the ramp, while the outer portion 225 is arranged to be in contact with the stationary ground portion 106 when the ramp assumes the material handling mode. In further detail, the outer portion 225 is arranged to telescope within the inner portion 223 in the direction of the arrow indicated by reference numeral 227. The telescopic portion 206 is thus arranged to slide over at least a portion of the towing vehicle when arranging the ramp to assume the material handling mode.

In order to describe a final example embodiment of the ramp 200, reference is made to FIG. 5 which illustrates a foldable ramp 202. The foldable ramp 202 is pivotably connected to the front portion 112 of the trailer 120 in a similar vein as described above for the embodiments in FIGS. 2 and 4. As can be seen in FIG. 5, the foldable ramp 202 comprises a pivot point 204. The pivot point 204 is preferably arranged at a center portion of the foldable ramp 202. As can be seen in dashed lines, the foldable ramp is folded when assuming the non-material handling mode, and as can be seen in solid lines, unfolded and extending in the major longitudinal forward direction of the vehicle when assuming the material handling mode.

Figure 6:
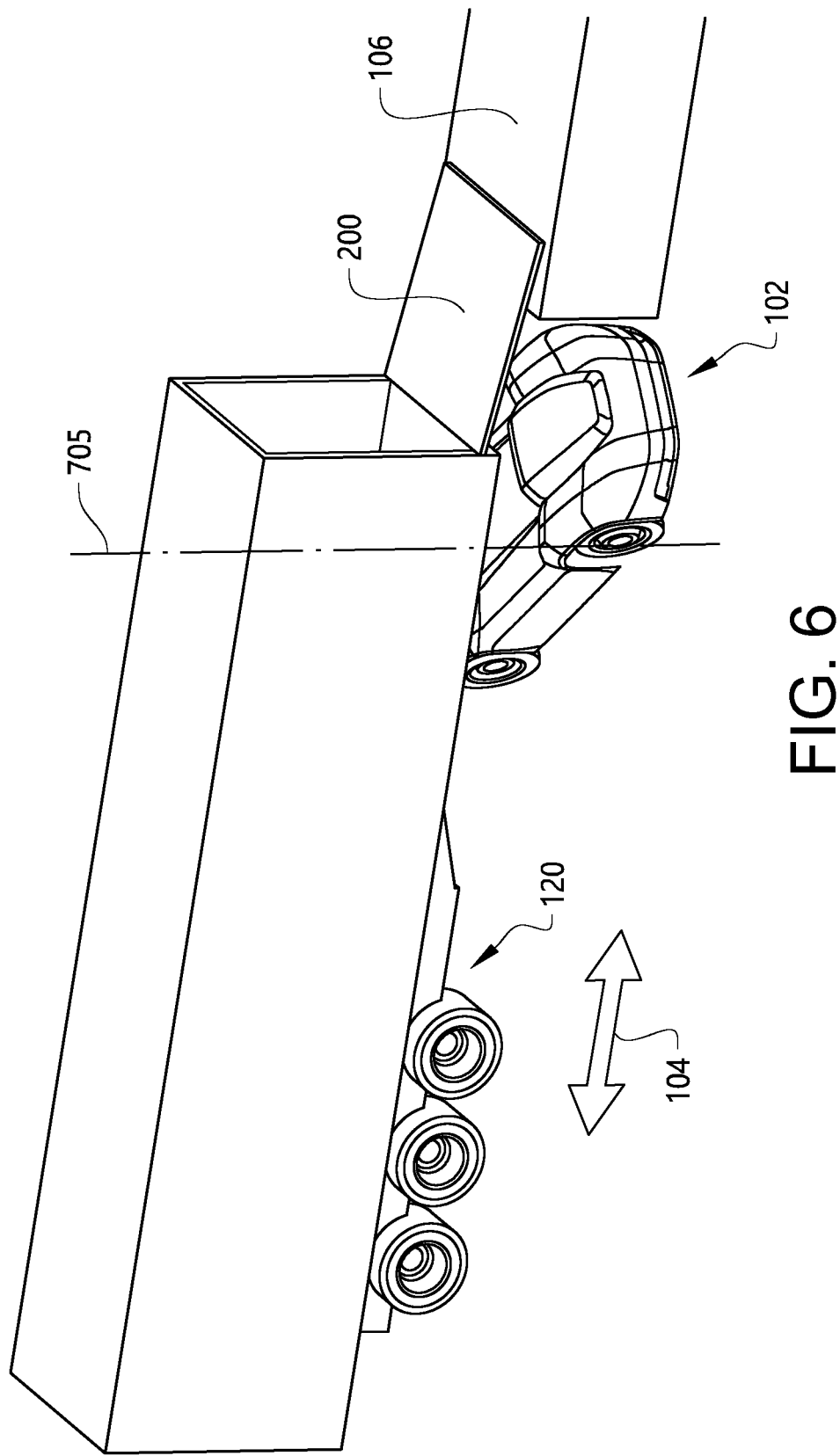
FIG. 6 is a schematic illustration of a vehicle during unloading of material according to an example embodiment.

Reference is now made to FIG. 6, which illustrates an example embodiment of how to arrange the towing vehicle 102 when the ramp 200 assumes the material handling mode. As can be seen, when the ramp 200 assumes the material handling mode for supporting transportation of material between the trailer 120 and the stationary ground portion 106, the towing vehicle 102 is pivoted relative the trailer 120 around a geometric axis 705. Hereby, the major longitudinal forward direction 104 is the forward direction of the trailer 120 and the ramp extends over a portion of the towing vehicle 102.

Figure 7:
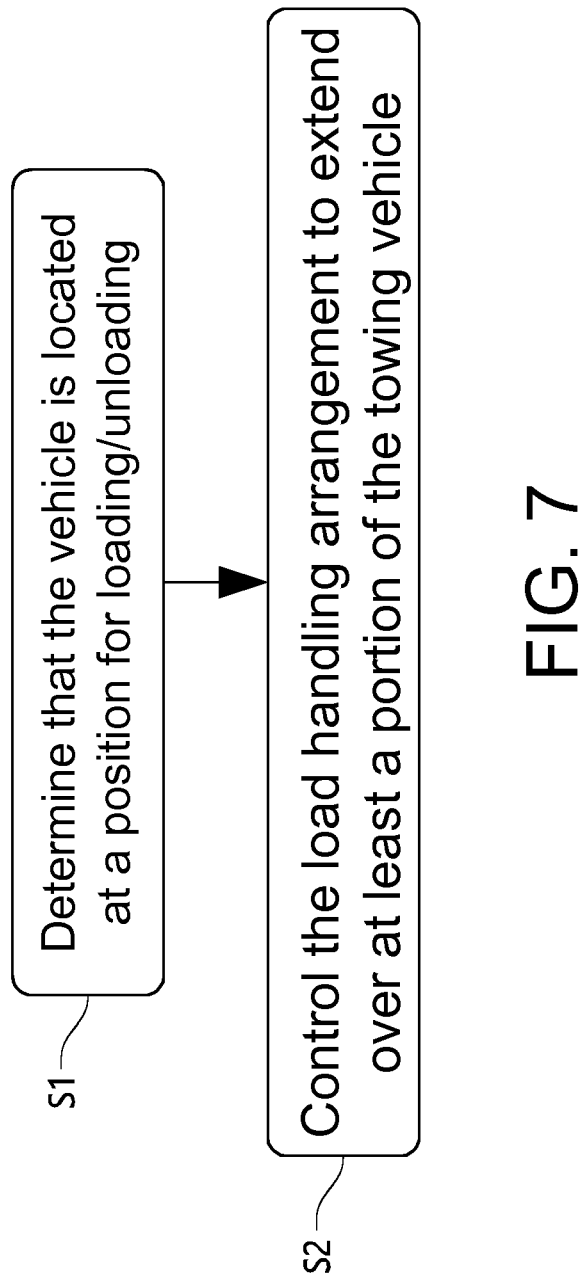
FIG. 7 is a flow chart of a method for controlling the load handling arrangement according to an example embodiment.

In order to sum up, reference is now made to FIG. 7 which illustrates a flow chart of a method for controlling the ramp 200 according to an example embodiment. During operation of the vehicle 100, a signal is received by the control unit 300, whereby the control unit 300 determines S1 that the vehicle is located at a position for loading/unloading of material to/from the vehicle 100. The control unit 300 then controls S2 the ramp to extend substantially in the major longitudinal forward direction 104 of the vehicle over at least a portion of the towing vehicle to the stationary ground portion 106 in front of the vehicle 100. Thereafter, the process of transporting material between the vehicle 100 and the stationary ground portion 106 can be initiated.

It is to be understood that the present disclosure is not limited to the embodiments described above and illustrated in the drawings; rather, the skilled person will recognize that many changes and modifications may be made within the scope of the appended claims.

The invention claimed is:

1. A vehicle comprising:
   at least a towing vehicle, the towing vehicle comprising steerable wheels and configured to convey the vehicle in at least a major longitudinal forward direction of the vehicle,
   a load handling arrangement configured to support transportation of material to or from the vehicle, the load handling arrangement configured to assume a material handling mode in which the load handling arrangement is configured to support transportation of the material between the vehicle and a stationary ground portion in the vicinity of the vehicle,
   wherein the load handling arrangement extends substantially in the major longitudinal forward direction of the vehicle over at least a portion of the towing vehicle when assuming the material handling mode,
   wherein the towing vehicle comprises a load support portion configured in front of the load handling arrangement, the load support portion being configured to support the load handling arrangement when the load handling arrangement assumes the material handling mode.

2. The vehicle of claim 1, wherein the load handling arrangement is further configured to assume a non-material handling mode in which the load handling arrangement is solely in connection with the vehicle.

3. The vehicle of claim 2, wherein the load handling arrangement is configured to be moved over at least the portion of the towing vehicle when changing the load handling arrangement from assuming the non-material handling mode to assuming the material handling mode.

4. The vehicle of claim 1, wherein the load handling arrangement is a ramp arranged to support load from the transported material to/from the vehicle.

5. The vehicle of claim 4, wherein the ramp is a foldable ramp comprising a pivot point around which the foldable ramp is pivotable for being extended substantially in the major longitudinal forward direction of the vehicle when assuming the material handling mode.

6. The vehicle of claim 4, wherein the ramp comprises a telescopic portion, wherein the telescopic portion is configured to be configured in an extended state when the ramp assumes the material handling mode.

7. The vehicle of claim 4, wherein the ramp comprises a rolled-up ramp configured in an unrolled state to form a substantially convex shape when the ramp assumes the material handling mode.

8. The vehicle of claim 7, wherein the rolled-up ramp comprises a plurality of ramp elements, each ramp element being pivotable relative its closest adjacent ramp element, wherein each ramp element is pivotable around a geometric axis which is perpendicular to the extension of the rolled-up ramp when assuming the material handling mode.

9. The vehicle of claim 8, wherein the rolled-up ramp comprises a locking element between the ramp elements, the locking element restricting the pivotable motion of the ramp elements.

10. The vehicle of claim 4, wherein the ramp is a slidable ramp configured to slide over at least a portion of the towing vehicle when configured to assume the material handling mode.

11. The vehicle according to claim 1, wherein the load support portion is adjustable in at least one of a vertical direction or a horizontal direction of the vehicle.

12. The vehicle of claim 1, wherein the load handling arrangement is one of an electronically controlled load handling arrangement, a hydraulically controlled load handling arrangement, a pneumatically controlled load handling arrangement, or a winch controlled load handling arrangement.

13. The vehicle of claim 1, wherein the vehicle comprises a trailer pivotably connected to the towing vehicle at a rear end of the towing vehicle.

14. The vehicle of claim 13, wherein the load handling arrangement is positioned on the trailer at a front portion of the trailer, the load handling arrangement being configured to extend from the front portion of the trailer and over at least a portion of the towing vehicle when the load handling arrangement assumes the material handling mode.

15. The vehicle of claim 13, wherein the towing vehicle is configured to be pivoted relative the trailer before the load handling arrangement assumes the material handling mode.

16. The vehicle of claim 1, further comprising a control unit configured to control operation of the load handling arrangement.

17. The vehicle of claim 16, wherein the control unit is configured to receive a signal indicative of the load handling arrangement being configured in connection with the ground when the load handling arrangement assumes the material handling mode.

18. The vehicle of claim 1, wherein the vehicle comprises a detector to detect obstacles in front of the towing vehicle.

19. The vehicle of claim 18, wherein the detector is one of a camera or a sensor.

20. The vehicle according to of claim 18, wherein the detector is positioned at a front end portion of the load handling arrangement.

21. The vehicle of claim 1, wherein the vehicle is an autonomous vehicle.

22. The vehicle of claim 1, the vehicle being a driver cabin free vehicle.

23. The vehicle of claim 22, wherein the towing vehicle has a height in the range between 1.40-1.80 meters.

24. A method for controlling a load handling arrangement of a vehicle, comprising:
   determining that a vehicle is located at a position for loading/unloading of material to/from the vehicle, the vehicle comprising a towing vehicle configured to convey the vehicle in at least a major longitudinal forward direction of the vehicle; and
   controlling a load handling arrangement of the vehicle to extend substantially in the major longitudinal forward direction of the vehicle over at least a portion of the towing vehicle to a stationary ground portion in front of the vehicle, the load handling arrangement configured to support transportation of material to or from the vehicle, the load handling arrangement supported by a load support portion of the vehicle when in connection with the stationary ground portion, the load support portion in front of the load handling arrangement.

25. A system for controlling a load handling arrangement of a vehicle, the system comprising:
   at least one vehicle comprising:
      a towing vehicle configured to convey the vehicle in at least a major longitudinal forward direction of the vehicle,
      a load handling arrangement configured to support transportation of material to or from the vehicle,
      a load support portion arranged in front of the load handling arrangement, the load handling arrangement is supported by the load support portion when in connection with the stationary ground portion, and
      a control unit for at least controlling operation of the load handling arrangement,
   a control station for communicating with the control unit of the vehicle,
   the system configured to:
      transmit a control signal from the control station to the control unit of the vehicle, the control signal being indicative that the vehicle is located at a position for loading/unloading of material to/from the vehicle; and
      control the load handling arrangement to extend substantially in the major longitudinal forward direction of the vehicle over at least a portion of the towing vehicle to a stationary ground portion in front of the vehicle.

* * * * *